E. L. BRUHN.
FASTENING DEVICE.
APPLICATION FILED MAR. 26, 1917.
1,249,592.
Patented Dec. 11, 1917.
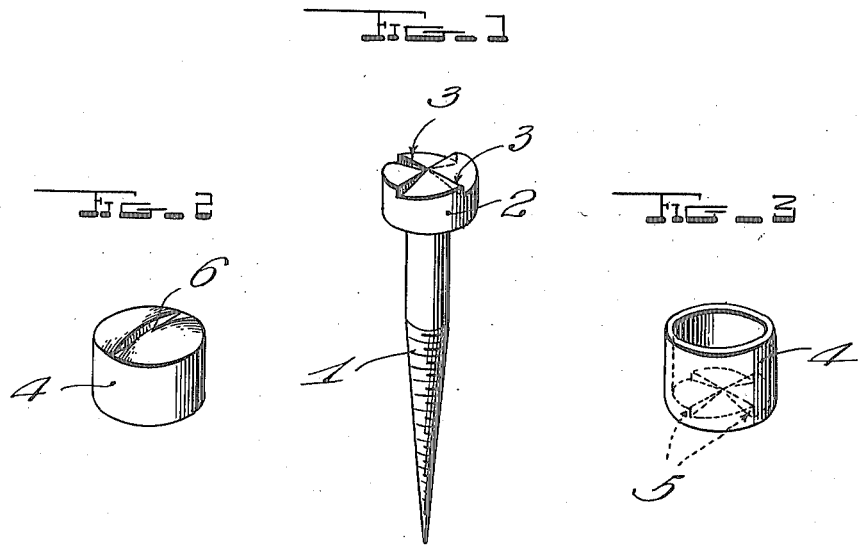
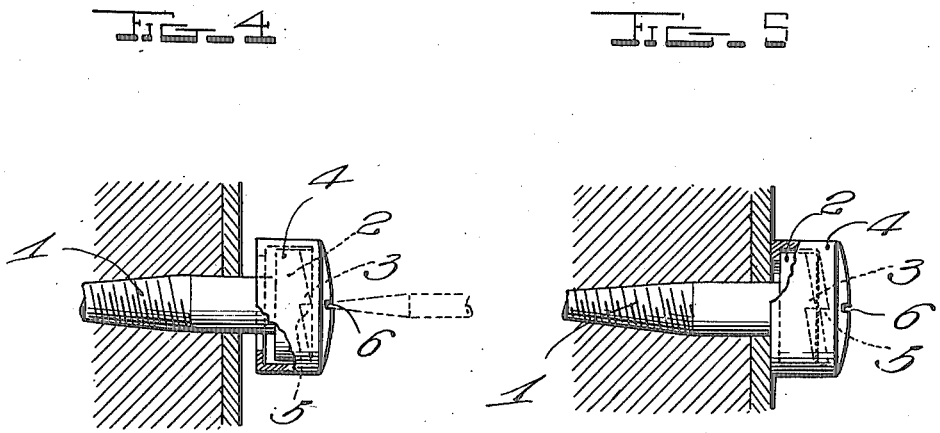
Witness
Inventor
Edward L. Bruhn
By H. B. Willson & Co.
Attorneys

UNITED STATES PATENT OFFICE.

EDWARD L. BRUHN, OF PITTSFIELD, MASSACHUSETTS.

FASTENING DEVICE.

1,249,592.   Specification of Letters Patent.   Patented Dec. 11, 1917.

Application filed March 26, 1917. Serial No. 157,561.

*To all whom it may concern:*

Be it known that I, EDWARD L. BRUHN, a citizen of the United States, residing at Pittsfield, in the county of Berkshire and State of Massachusetts, have invented certain new and useful Improvements in Fastening Devices; and I do declare the following to be a full, clear, and exact description of the invention, such as will enable others skilled in the art to which it appertains to make and use the same.

This invention relates generally to hardware, but more particularly to certain new and useful improvements in fastening devices such as bolts, screws and the like.

One object of the invention is to provide a fastening device such as a bolt or screw with a tool engaging member which is inoperative to rotate the device when it is attempted to remove the same from the object in which it is inserted.

Another object of the invention is to generally improve upon fastening devices by the provision of an extremely simple, strong, durable and inexpensive construction and one which will be efficient and reliable in operation and well adapted to the purpose for which it is designed.

With these and numerous other objects in view, the invention resides in certain details of construction, and the combination and arrangement of parts, as will be hereinafter fully described and claimed.

In the accompanying drawings, forming a part of the application, and in which similar reference characters are used to designate corresponding parts throughout the several views:

Figure 1 is a perspective view of a screw provided with a head constructed in accordance with this invention;

Fig. 2 is a similar view of one end of the cap member used in connection with the screw;

Fig. 3 is a similar view of the other end of the cap member;

Fig. 4 is a sectional view through an object in which the screw is partially inserted, showing the latter in side elevation but partly broken away;

Fig. 5 is a similar view showing the screw completely inserted in said object.

Referring more particularly to the drawings, the numeral 1 designates a fastening element, which it is to be understood may be of any form, but which is shown in the present instance for the purpose of illustration as being a screw. The fastening element or screw 1 is provided with a head 2, which is unlike the heads commonly formed on ordinary screws, in that this head is not provided with a slot to receive the screw driver. Instead of this slot, the head 2 is provided with a series of ratchet teeth 3, the purpose of which will be hereinafter described.

Rotatable in one direction upon the fastening element or screw 1 is a member 4, which is preferably in the form of a cap. The free edges of the wall of the member or cap 4 at one end thereof are crimped inwardly around the inner side of the head 2 to retain the cap thereon but allowing it to have a slight longitudinal movement with respect to the screw. The inner side of the closed end of the cap 4, or, in other words, the side which is disposed in opposing relation to the side of the head 2 of the screw having the ratchet teeth thereon, is provided with ratchet teeth 5, the latter coöperating with the ratchet teeth 3 to prevent the cap from rotating in one direction. The other side of the closed end of the cap 4 is provided with a groove 6 to receive the blade of a screw driver.

In using the above described device it will be understood that when the screw is screwed into an object by means of a screw driver, the pressure exerted upon the cap will be sufficient to cause the same to press tightly against the head of the screw and thus cause the coöperating ratchet teeth to engage each other and prevent rotation of the cap upon the screw. When, however, the cap is turned in the other direction, the coöperating ratchet teeth will no longer engage each other to turn the screw, and the cap will rotate upon the same. When the screw is to be screwed into the object as far as is possible, the inner end of the cap will be caused to bear against said object. This obviously causes the cap to be moved slightly outwardly in a longitudinal direction with respect to the screw and thus move the ratchet teeth carried by the cap out of the path of the ratchet teeth carried by the head of the screw. The cap will thus rotate in either direction without turning the screw in either direction.

The principle of the invention may be practically embodied in connection with bolts, screws, nuts and many other forms of fastening devices, and is merely shown embodied in connection with a screw for the purpose of illustration. This is a practical embodiment, however, as ordinary strap door hinges, hasps and the like may be secured in place by screws of this construction which cannot be removed, and hence the danger of theft is to some extent overcome.

From the foregoing description, taken in connection with the accompanying drawing, the construction, use and operation of the device will be readily understood without a more extended explanation.

As various changes in form, proportion and in the minor details of construction may be resorted to without departing from the spirit of the invention, it is to be understood that I do not wish to be limited to the construction herein shown and described other than as claimed.

I claim:—

1. A device of the class described comprising a fastening element, a tool engaging member connected to said element and rotatable in one direction upon the same, and means for preventing rotation of said element in the other direction.

2. A device of the class described comprising a fastening element, a tool engaging member connected to said element and rotatable in one direction upon the same, and coöperating ratchet means carried by said element and said member for preventing rotation of the latter upon said element in the other direction.

3. A device of the class described comprising a fastening element, a cap rotatable in one direction upon one end of said element and provided with tool engaging means, and means for preventing rotation of said cap upon said element in the other direction.

4. A device of the class described comprising a headed fastening element, a cap rotatable in one direction upon the head of said element and provided with tool engaging means, said cap having a slight longitudinal movement with respect to said element, and coöperating ratchet teeth arranged on the opposing sides of said element and said cap for preventing rotation of the latter upon said element in the other direction.

In testimony whereof I have hereunto set my hand in the presence of two subscribing witnesses.

EDWARD L. BRUHN.

Witnesses:
 WILLIAM H. WEASER,
 JAMES FALLON.